US006401173B1

United States Patent
Razdan et al.

(10) Patent No.: US 6,401,173 B1
(45) Date of Patent: Jun. 4, 2002

(54) METHOD AND APPARATUS FOR OPTIMIZING BCACHE TAG PERFORMANCE BY INFERRING BCACHE TAG STATE FROM INTERNAL PROCESSOR STATE

(75) Inventors: Rahul Razdan, Princeton; David Arthur James Webb, Jr., Groton; James B. Keller, Waltham, all of MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/237,519

(22) Filed: Jan. 26, 1999

(51) Int. Cl.[7] .............................................. G06F 12/00
(52) U.S. Cl. ...................................... 711/141; 711/122
(58) Field of Search .................................. 711/119, 122, 711/131, 3, 141; 365/230.08; 712/34

(56) References Cited

U.S. PATENT DOCUMENTS

| | | | |
|---|---|---|---|
| 5,577,227 A | * 11/1996 | Finnell et al. ............... 711/122 |
| 5,615,167 A | * 3/1997 | Jain et al. ............... 365/230.08 |
| 5,809,320 A | * 9/1998 | Jain et al. ...................... 712/34 |
| 5,897,651 A | * 4/1999 | Cheong et al. ................ 711/3 |
| 5,924,120 A | * 7/1999 | Razdan et al. ............... 711/141 |
| 6,049,853 A | * 4/2000 | Kingsbury et al. .......... 711/147 |

* cited by examiner

Primary Examiner—Do Hyun Yoo
Assistant Examiner—Nasser Moazzami
(74) Attorney, Agent, or Firm—Hamilton, Brook, Smith & Reynolds, P.C.

(57) ABSTRACT

An architecture which splits primary and secondary cache memory buses and maintains cache hierarchy consistency without performing an explicit invalidation of the secondary cache tag. Two explicit rules are used to determine the status of a block read from the primary cache. In particular, if any memory reference subset matches a block in the primary cache, the associated secondary cache block is ignored. Secondly, if any memory reference subset matches a block in the miss address file, the associated secondary cache block is ignored. Therefore, any further references which subset match the first reference are not allowed to proceed until the fill back to main memory has been completed and the associated miss address file entry has been retired. This ensures that no agent in the host processor or an external agent can illegally use the stale secondary cache data.

7 Claims, 6 Drawing Sheets

METHOD AND APPARATUS FOR OPTIMIZING BCACHE TAG PERFORMANCE BY INFERRING BCACHE TAG STATE FROM INTERNAL PROCESSOR STATE

FIELD OF THE INVENTION

The present invention relates to data processing system design and in particular to accelerating cache memory performance.

BACKGROUND OF THE INVENTION

A number of microprocessor design features are now considered essential in order to obtain high performance at low cost. For example, processor implementations now typically allow issuance of multiple instructions during each clock cycle. Most such processors also employ cache memories to provide a latency and bandwidth advantage for reasonably large data blocks such as on the order of one megabyte or more. The cache memories permit high speed pipelined execution to occur while minimizing delays associated with reading and writing data.

Cache memories operate by mirroring the contents of main memory in a way which is transparent to a Central Processing Unit (CPU). For example, each memory address referenced by an instruction is first passed to a cache controller. The cache controller keeps track of which portions of main memory are currently assigned to the cache. If the cache is currently assigned to hold the contents of the requested address, a "cache hit" occurs and the cache is enabled to complete the memory reference access, whether it be a write or a read access. If this is not the case, a "cache miss" has occurred, and the main memory is enabled for access. When a miss occurs, the cache controller typically assigns the miss address to the cache, fetches or "fills" the data contained at that address from main memory and stores it in the cache, and if necessary, displaces the contents of a corresponding cache location.

Cache memories are implemented in a hierarchy with a primary data store or main memory being the lowest order of the hierarchy, a secondary cache or backup cache ("bcache") being a middle level of the hierarchy, and a primary level cache or "dcache" being the highest level cache. The bcache, for example, may be a "board level" cache implemented with memory chips external to the processor chip and the dcache may be implemented with on-chip memory devices.

It is desirable for the physical existence of the various cache hierarchy levels to be transparent. For example, the programmer should only have to worry about implementing instructions and not be concerned with the details of whether a particular target address is located in the dcache, bcache, or main memory. Furthermore, the programmer should be permitted to assume that the data written back to memory by a store instruction (STx) will always be written back properly. This important property of cache hierarchies is known as cache coherency.

In general, cache memories consist of a tag portion in addition to a data storage portion. The tag portion contains address and status bits for the data contained in the storage portion. The data portion contains typically multiple data bytes for each addressable cache location.

To complete an instruction reference to a cache memory, the data and tag memories are first read. If the referenced address matches the address in the tag portion, a hit occurs and then data associated with the tag is delivered to the consuming instruction. If the tags do not match, the data referenced by the consuming instruction must then be fetched and written into the cache. Cache filling is an operation by which the contents of the cache are copied back to main memory, and must typically be performed prior to displacing a "victim" cache location with the new data in order to avoid losing the contents of the victim location. It is therefore common to include a so-called "dirty" bit with each cache location, indicating whether the data for the cache location is different from the corresponding data in the next lower level of the hierarchy.

After the victim block has been written, but before the memory fill for the new block may proceed, the tag array still contains the victim address. During this period of time, if the same location is again accessed by another outside agent such as a second processor, the cache might provide a false hit response. One way of dealing with this problem is to allow this false hit response to occur, but then depend upon the fact that the data in the cache is the same as the data in the main memory until the memory fill updates the processor. This assumption is valid when the processor and the cache use a shared data bus. For example, in most known computing system architectures, the caches and main memory typically share a data bus. Therefore, the necessary fill operations may be completed for each level of the cache simultaneously.

A complication for cache management occurs if the system architecture permits sharing of write access to main memory locations among processors. Probe commands are therefore typically used in such architectures to allow one processor to inform another processor that it is attempting to write to a particular location. This allows the first processor to properly execute the store conditional instructions. However, the need to support such probe commands requires each processor to be able to determine whether it presently has the only valid contents of a main memory location in one or more of its own caches.

SUMMARY OF THE INVENTION

In the present invention, the primary level cache (dcache) and second level cache (bcache) do not share a common bus for access to the main memory. Rather, the dcache is provided with two different data buses to separately access the main memory and the bcache in order to provide higher bandwidth to each of these structures. In this case, a memory fill operation from the main memory may be consumed directly by the dcache without first having to wait for a fill operation in the bcache to complete.

Since the bcache bus is normally a high speed pipelined read bus, this avoids necessarily turning around the bus in order to update the bcache during the pendency of some other critical operation. Otherwise, one would have to wait for the bcache pipeline to drain, initiate the store operation, wait for the pipeline to drain again, and then turn the pipeline back around for subsequent read operations.

While this architecture improves processor performance by allowing the higher speed dcache memory to complete a fill operation without waiting for the slower bcache memory, there is a problem in that strict cache hierarchy rules are violated. In effect, the rules of cache hierarchy coherency are temporarily "bypassed" in the sense that the bcache is not immediately updated with the fill data. Thus, the bcache may not be updated for a long period of time and there is no guarantee that "stale" data in the bcache is the same as that in main memory.

A simple solution to this problem might be to either invalidate the bcache tag on all bcache victim operations, or otherwise to insure that all fill operations are cycled through the bcache, i.e., disable the bypassing mode. However, these approaches either consume precious bcache tag or dcache memory bandwidth.

Thus, while a processor according to the present invention uses two independent memory access ports for the bcache memory and the main memory, a set of rules are also observed by the processor to enable it to infer the bcache state without unnecessarily performing bcache reads.

In accordance with the invention, upon the issuance of a memory reference instruction such as a load or store instruction, the dcache memory array is first checked to see if it has the contents of the referenced location as is typical. If there is a hit in the dcache, then the memory access is complete.

However, if a dcache miss occurs, then a bcache read is initiated. In the process of reading data from the bcache, if it becomes apparent that a dcache victim operation will be required, i.e., that the dcache is already full and dcache locations will need to be displaced in order to copy new information from the bcache to the dcache, a determination is first made as to whether or not the dcache victim block is dirty. If the dcache victim block is dirty, this block must be scheduled for eviction either to the bcache or to main memory. If an index portion of the memory reference location is not equal to the index portion of the dcache victim block, then the dcache victim block should be evicted to the bcache.

If the index portions do match (this is called a "subset match") and the old dcache block was dirty, then the block should be scheduled for eviction to main memory. In particular, it can be inferred in this instance that the particular bcache is stale as having been bypassed on a previous fill operation. In other words, if the bcache index block is the same as the referenced address, then the processor infers that the two data blocks are attempting to reside in the same location in the bcache, the processor infers that the copy in the bcache is stale. Thus, the victim dcache data should be written back directly to main memory, bypassing the bcache.

Continuing with the bcache read operation, a tag lookup for the referenced memory location is performed in the bcache tag array and a bcache memory fill to the dcache is allowed to proceed if the tags match. However, the dcache victim block is evicted directly to main memory in this instance as the processor has time to complete the eviction process, such as through a victim buffer. If, in this instance, the bcache tag is dirty and the dcache has not already been evicted to main memory in the prior steps, an inference can be made that the bcache contents are not stale. The bcache victim block must therefore also be moved back to main memory.

If the lookup in the bcache tag array did not produce a match, then it will be necessary to fetch the data from main memory. In this instance, the referenced address is placed in a miss address file (MAF) and the fill from the main memory to the dcache proceeds directly. During this process, if the victim dcache block was dirty, then it needs to be evicted back to main memory by placing it in the victim buffer and extracting it as the processor has time. Once the victim block has been removed to main memory, then the referenced address is removed from the miss address file.

The miss address file provides additional assurance that stale bcache data will not be used. In particular, upon a subsequent subset match between a referenced location and an address in the miss address file, the memory reference is not allowed to proceed until the miss address file is cleared. In the event of an external probe operation, a memory lock response will be provided until the miss address file is cleared.

It can now be understood how the present invention allows for an architecture which splits the memory buses and maintains cache hierarchy consistency without performing an explicit invalidation of the bcache tag. Two explicit rules are used to determine the status of a block read from the dcache. In particular, if any memory reference subset matches a block in the dcache, the associated bcache block is ignored. Secondly, if any memory reference subset matches a block in the miss address file, the associated bcache block is ignored. Therefore, any further load store references which subset match the first reference are not allowed to proceed until the fill back to main memory has been completed and the associated miss address file entry has been retired. This ensures that no agent in the host processor or an external agent can illegally use the stale bcache data.

An additional complication comes from the fact that a second processor in a multiprocessor arrangement may issue probe commands. In response to such a probe command, the first processor must check to see if it is in the process of accessing the data. Normally, this access operation is executed by looking in the contents of the bcache. However, in an instance where the memory data buses are split, the processor must not only consume cycles to check the bcache, but also consume different caches in order to determine if an address is locked in the dcache. Therefore, what is needed is a technique for allowing the processor to infer the bcache state not only for its internal operations, but also for optimized response to external probe commands.

The present invention also provides an elegant solution in this instance as well. In particular, memory references generated by probe commands follow the same process flow except that they do not generate victim transactions (i.e., probe commands are simply requested to determine whether or not a location has been locked and do not attempt to write the location).

DETAILED DESCRIPTION OF THE INVENTION

Figure 1:
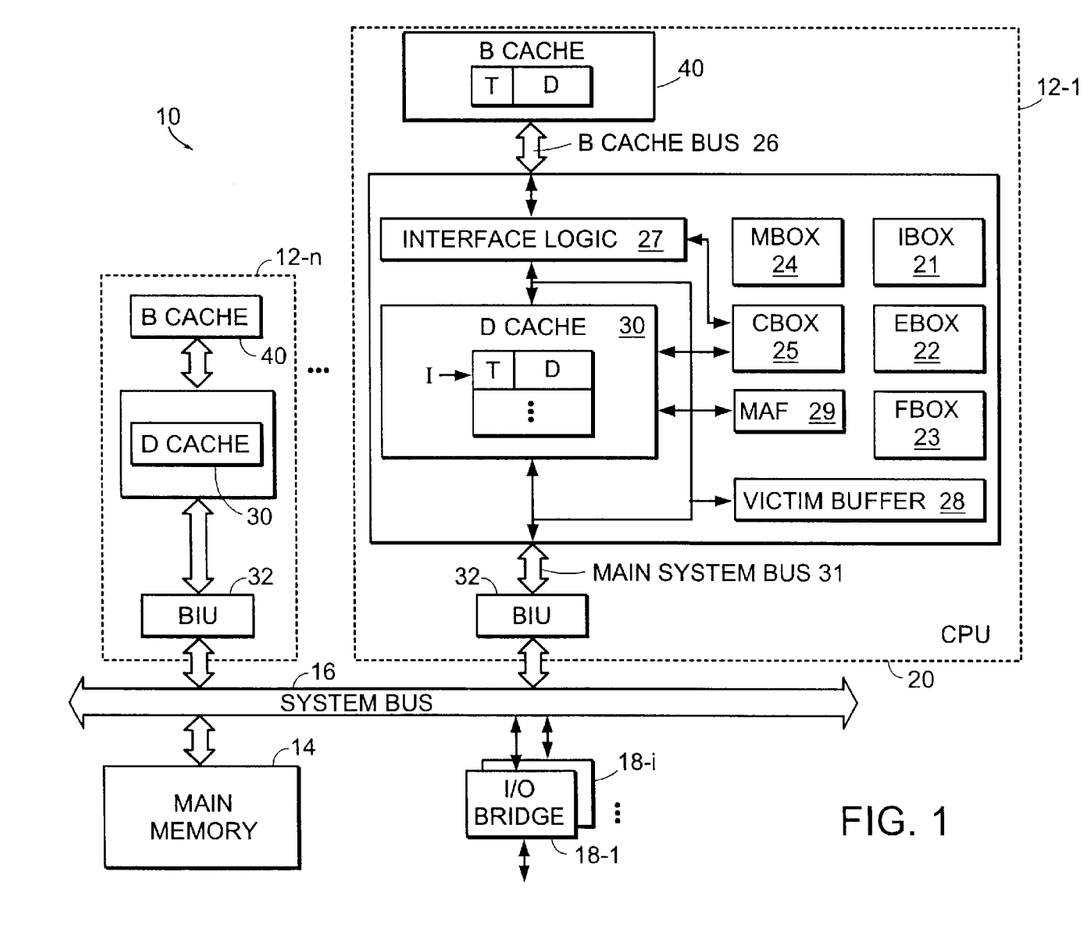
FIG. 1 is a block diagram of a data processing system that includes a cache memory hierarchy and cache memory control logic within each of multiple processors according to the invention.

Turning attention now to FIG. 1, a data processing system 10 consists typically of one or more data processor modules 12-1, . . . , 12-n (collectively referred to as processors 12), a main memory 14, a system bus 16, and one or more input/output interfaces or bridges 18-1, . . . , 18-i. The system bus 16 allows the processors 12 to provide data to and read data from peripheral devices connected to the I/O bridges 18, and also permits the processors 12 to share access to information stored in the main memory 14. In a multiprocessing environment, one of the processors 12-n may be accessing data stored at a particular location in the main memory 14 at a particular time. The processor 12-n may request write access to the data stored in main memory 14 by sending a probe command to the other processors 12 over the system bus 16. If any other processor 12 reports back that it is presently performing a write access to the location in the main memory 14, then the access is not permitted to proceed.

Within each processor module 12, there exist other circuit elements such as a central processing unit (CPU) 20, a bus interface unit (BIU) 32, and a secondary or board level cache (bcache) 40. Each CPU 20 further includes several logic elements which enable the major operations that the system 10 requires. Ibox 21, or instruction fetch and decode unit, controls instruction prefetching, instruction decoding, branch prediction, instruction issuance, and interrupt handling. The ebox 22, or integer execution unit, handles the functions of addition, shifting, byte manipulation, logic operations, and multiplication of integer values. The same operations are controlled by the fbox 23, or floating point execution unit, for floating point values. The memory address translation unit, or mbox 24, translates virtual addresses generated by programs running on the system into physical addresses which are then used to access physical locations. Lastly, and of most importance to the present invention, a cache controller, or cbox 25, manages access to a primary level data cache, or dcache 30. It also controls external access to the secondary level bcache 40 through interface logic 27. In addition, the cache controller 25 makes use of a victim buffer 28 and miss address file (MAF) 29 in a manner which will be more fully described below.

As shown in FIG. 1, a separate and distinct interface is provided between the CPU 20 and the main memory 14, e.g., the main system bus 31, from the interface provided between the CPU 20 and the bcache 40, e.g., the bcache bus 26.

In general, the dcache 30 is composed of fast access time storage devices such as static random access memory (SRAM) integrated circuits. The dcache 30 mirrors the contents of the main memory 14 to speed up the overall access time of the system 10. In particular, when the CPU 12 provides a main memory address, the cache controller (cbox) 25 first checks to see if the memory location corresponding to the input address has been assigned to the dcache 30. If so, the cache controller 25 enables the dcache 30 so that the data access can take place. If, however, the cache controller 25 does not recognize the address as one that has been assigned to the dcache 30, then a cache miss signal is asserted and the memory controller 25 enables either the main memory 14 or the bcache 40 to complete the desired access in a manner which is described below.

Accesses to and from the dcache 30 typically occur in groups of bytes known as a cache line. The size of a cache line depends upon the number of bits that can be accessed in parallel in a single cache memory operation. In the example being discussed herein, the dcache 30 contains cache lines of sixty-four (64) bytes each. A total number of locations in the dcache 30 described herein is 64 kilobytes (64 KB).

The cache controller 25 also executes another operation with respect to maintaining the integrity of the main memory 14. In particular, during write accesses by the CPU 12 to the dcache 30, locations in the cache 30 are eventually rewritten such that data in the corresponding locations in main memory 14 no longer correspond to the data in the cache. In such an instance, the cache line contains the correct data and not the corresponding main memory locations. The cache locations for which this occurs are indicated by setting a corresponding dirty bit for the associated cache line each time the dcache 26 is written with new data.

During normal operation of the CPU 12, this is not of particular concern as long as the contents of the dcache 30 remain intact. However, each time that the CPU 12 requests access to data which is not in the dcache 30, new data must be read from main memory 12 or the bcache 40 and stored into the dcache 30. Eventually, the contents of some other location in the dcache 30 must be displaced in order to accommodate the new data which is now desired to be cached. In this instance, a so-called victim transaction is executed, whereby if the dirty bit has been set in the associated cache line, the cache line data to be displaced is first moved to a victim buffer 28 prior to being written back to main memory 14.

Figure 2A:
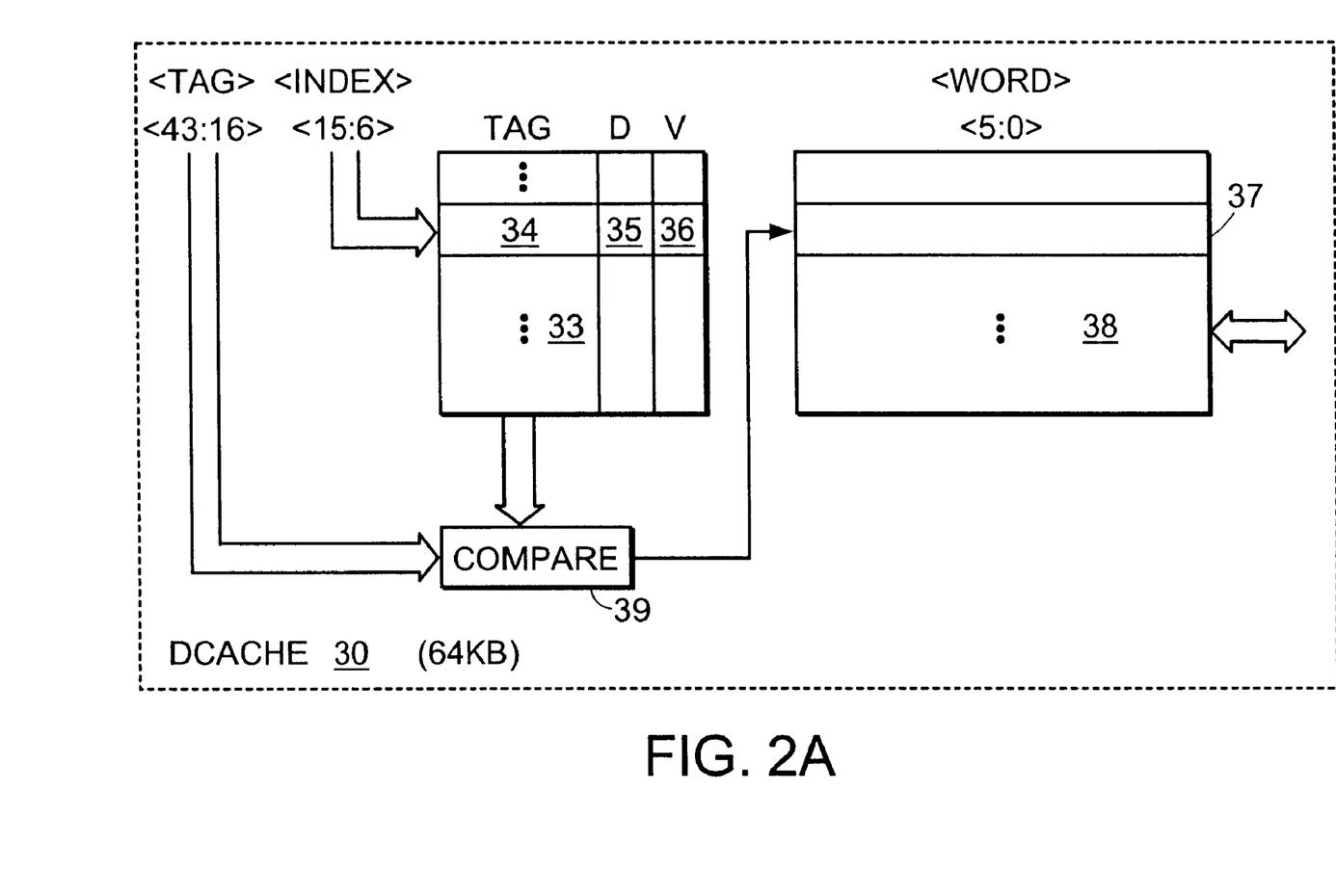
FIG. 2A is a more detailed view of a dcache memory.

A more detailed view of a typical write-through dcache memory 30 is shown in FIG. 2A. The cache memory 26 includes a tag array 33 and a data array 38. As is well known in the art, the tag array 33 keeps track of which locations in main memory 14 have been assigned to the dcache 30. This is done by storing a main memory address in a location 34 of the tag array 33 corresponding to a cache line 37 in the data array 38 which holds the data for the main memory address.

The tag array 33 therefore consists of a number of locations 34-1, 34-2, . . . , 34-n in which are stored main memory addresses.

The data array 38 consists of a like number of locations or cache lines 37-1, 37-2, . . . , 37-n. In the illustrated dcache 30, each cache line 37 in the data array 38 consists of sixty-four (64) bytes. As described previously, in the present embodiment designated herein, k equals 1024.

Each cache line 37 has an associated valid bit 36, typically stored as part of the tag array 33. The valid bit 36 indicates whether a particular cache line 37 associated with it has been overwritten since last being read from the main memory 14. For example, the valid bit 36 is set when data is first read from the main memory 14 and written into the associated cache line 37. In this manner, when it becomes time to overwrite data in the cache, the valid bits 36 serve to inform the system 10 which cache lines 37 need to be rewritten back to the main memory 14 in a victim transaction, i.e., which locations in the cache contain the valid copies of the data.

The tag array 33 also includes a dirty bit 35 for each corresponding cache line 37. A dirty bit 35 is set to indicate that the associated cache line 37 contains the correct copy of the data and that the associated location in the main memory 14 may have incorrect data. This may typically occur when the cache 30 is enabled for write access; e.g., the CPU 12 writes the cache directly and the correct data is only contained in the dcache 26.

As a result, a dirty bit 35 is typically not set in normal operation unless the corresponding valid bit 36 is also set. In other words, the only locations which become "dirty" in the main memory 14 are those for which the dcache 30 contains the valid data. The dirty bit 35 is set whenever the CPU 12 overwrites the data in a cache line 37, and is cleared whenever data is copied back from the cache line 37 to main memory 14.

Figure 2B:
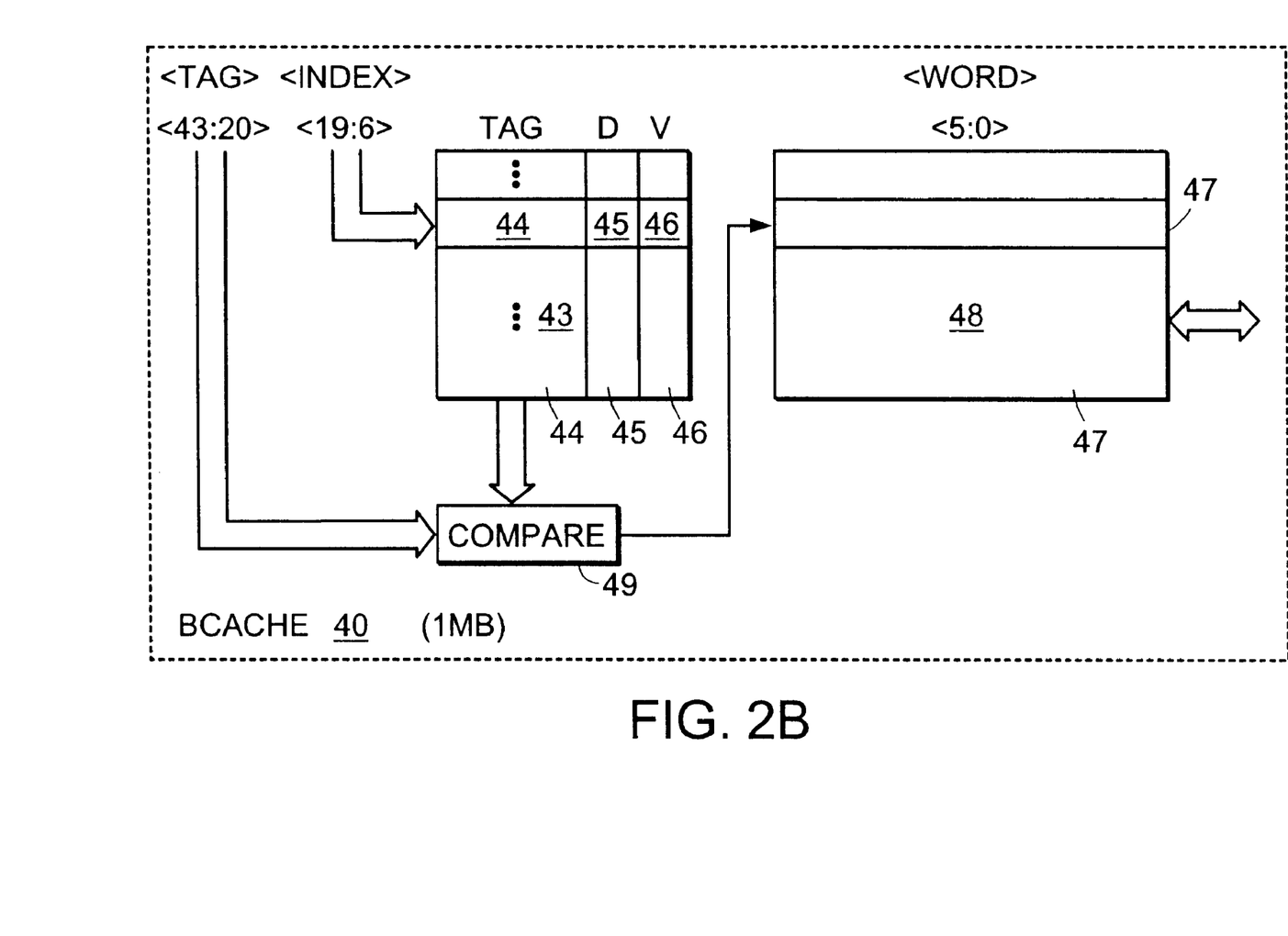
FIG. 2B is a more detailed view of a bcache memory.

The bcache 40 similarly consists of a tag array 43 and data array 48 with associated tag entries 44, dirty bits 45, and valid bits 46. In the process of executing an instruction that contains a reference to a location stored in the bcache 40, the tag and data SRAMs are read. If the referenced address matches the address in the bcache 40 such as indicated by the comparator 49 outputting a tag match, the data from the corresponding data portion 47 is delivered to the consuming instructions. If the addresses do not match, and if the tag 45 is in the dirty state (indicating that the data has been updated since it was last read from main memory 14), the data is written back to main memory 14. In addition, the newly referenced data is fetched from main memory 14.

After the so-called victim data has been written out of the bcache, but before the memory fill for the new block, the bcache tag array 43 still contains the victim address. Therefore, an access is permitted to the tag array by another outside agent, a false hit response may be provided. Past architectures would permit this false hit response and depend upon the fact that the data in the bcache 40 is the same as the data in the main memory 14 until the main memory fill updates the processor. In other words, such architectures depended upon the dcache memory 30 and the bcache 40 using a common data bus. This permitted the bcache fill to occur at the same time as a dcache fill.

In the architecture shown in FIG. 1, however, the main system bus 31 and bcache data bus 26 are split. This provides higher bandwidth capability to each of the structures.

By splitting the main system bus 31 and bcache bus 26, the dcache 30 and bcache 40 may operate independently. In particular, the main memory 14 is inherently slower than the bcache 40 and, in turn, the bcache 40 is inherently slower than the dcache 30. For example, it is typically possible for ten bcache 40 transactions to be completed in the time it takes only one main memory 14 transaction to complete. By placing the dcache 30 "in front of" the bcache 40, this speeds up the availability of the data to the CPU 20.

In this case, a memory fill operation back from main memory 14 is consumed by the CPU 20 and, bypassing the bcache 40, fed only directly to the dcache 30. Thus, the dcache 30 has the data available immediately. However, since the bcache 40 is only updated as the processor 12 has time to forward the new fill data over the bcache bus 26, there is no guarantee that "stale" data in the bcache 40 always reflects the contents of main memory 14.

One simple solution to the problem might be to either invalidate the entry in the bcache 40 tag array 43 on all bcache victim operations, or to a cycle all fills through the bcache 40. Both approaches consume bcache tag or data bandwidth.

Furthermore, this architecture on its face violates the so-called cache pyramid rule of hierarchy. In particular, it is generally desirable to keep the hierarchy of caches 30, 40 coherent. For example, if a change is made to the dcache 30, the same change must also be made to the "lower level" bcache 40. Likewise, if a change is made to the bcache 40, an update must be made to the main memory 14. However, keeping the pyramid intact on an access-by-access basis incurs a large cost. For example, the bcache bus 26 is normally configured to be optimized for reading data, i.e., it is a pipeline bus for feeding data into the CPU 20. In order to the update the contents of the bcache 40, the bcache bus 26 must wait for any in-process read transactions to complete. The signaling direction of the bus must then be turned around before the write operation can be initiated.

An additional difficulty comes from the fact that the system 10 is expected to support a multiprocessing environment. In particular, another processor module 12-n may be sending a probe command to processor module 12-1 in order to determine if a particular main memory location 14 is in use or "locked." In this instance, the CPU 12-1 must check to see if it has written the data either to its dcache 30 or bcache 40. Normally, the CPU 20 handles such probe commands by first checking in the bcache 40. That is, because of the rules of pyramid integrity, the CPU need not interrupt a dcache operation in order to check whether the CPU has the data, the lower level memory 40 can be checked instead. This minimizes interruptions to the dcache 30 operations that may be concurrently executing. Thus, since the bcache lookup does not incur as much of a cost, it is a preferred method for determining the results of a probe.

Figure 3A:
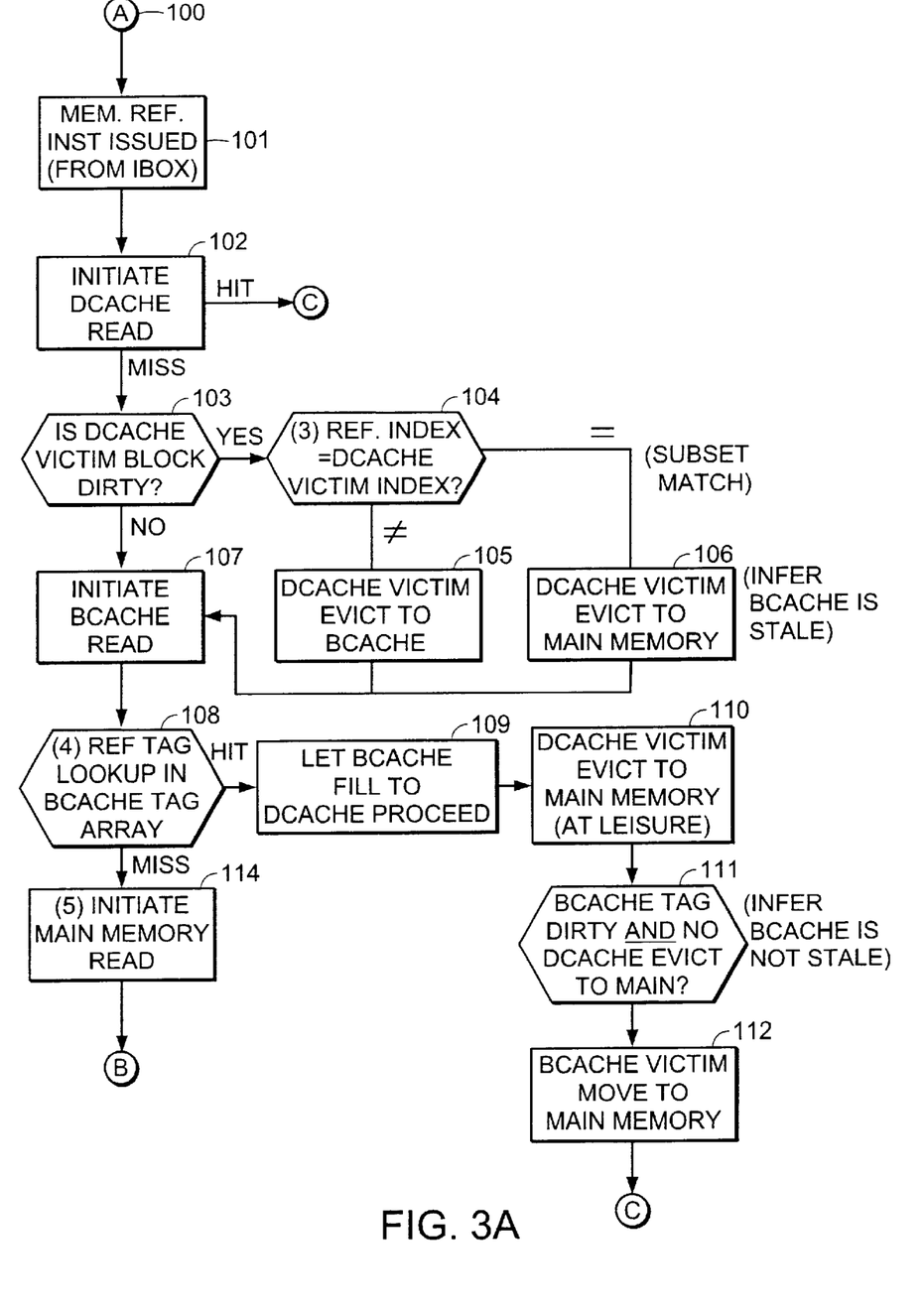
FIGS. 3A and 3B include a state diagram of the operations performed by a cache memory controller in accordance with the invention.

The present invention provides a solution to these problems by inferring the proper state of the bcache 40 from internal processor state. FIG. 3A shows a sequence of operations performed by the cache controller 25 in order to implement this scheme to infer the bcache state without actually having to read or write data to it. In particular, in a first state 100, the CPU is idle and no memory reference instructions are being processed. Eventually, a state 101 is entered in which a memory reference instruction is issued such as from the instruction box 21. The memory reference instruction contains an address typically in the form of a main memory 14 address, one or more of which are needed for completion of the instruction. In this instance, a state 102 is entered into in which an attempt is made to initiate the read from the dcache 30. If this is successful, in other words, if there is a "hit" in the dcache 30, then processing is complete and returned to an end state C.

If, however, the result of the tag comparison is a miss, then a state 103 is entered in which a test is made to determine if the dcache victim "block" is dirty. In this case, the dcache victim block is a block in the dcache which will be displaced by the data which will have to be read in from the bcache 40, or possibly the main memory 14. If the corresponding dirty bit 35 is set, then a state 104 is entered in which an additional comparison is made. This comparison is made in order to determine whether the victim block can be evicted to the bcache 40 or whether it should be evicted directly back to main memory 14. The eviction process may make use of a victim buffer 28, such as is known in the prior art, in order to free the CPU 20 from having to wait for the main memory 14 to become available.

In particular, in state 104, if the index portion of the memory reference contained in the pending instruction is equal to the index portion of the dcache victim block, this is a so-called subset match indication. In this instance, the dcache victim must be evicted to main memory 14. In other words, an inference is made that the contents of the bcache are stale, and therefore it is not necessary, and indeed preferable, to avoid updating it. This is the "bypass case" wherein the data was read into the dcache 30 directly and has not yet been fully updated in the bcache 40.

Alternatively, from state 104, if the referenced memory location index is not equal to the dcache victim index, then this block is scheduled for eviction to the bcache.

If, for example, a miss is encountered but the block was not dirty, then the block can simply be overwritten with the new block and state 107 can be entered directly. Thus, in this instance, the victim dcache data does not need to be written back to either the bcache or the main memory.

Upon entry of state 107, the cbox 25 next tries to obtain the data from the bcache 40. After initiating a read operation from the bcache 40 causes in state 108 a reference tag lookup to occur in the bcache tag array 43. If there is a hit, that is, if the data is contained in the bcache and it is still valid, then the fill operation is permitted to proceed writing to the dcache 30 directly through the pipeline bcache bus 26 in state 109. In the meantime, in state 110, any victim dcache data which must be evicted to main memory 14 (i.e., if the victim dcache data was dirty in state 103), a dcache victim process begun in state 106 can continue. If, however, there is no dcache eviction in process back to the main memory 14 and the corresponding bcache location tag is dirty in state 111, then an inference can be made that the bcache contents are not stale. Therefore, any bcache victim blocks must be moved back to main memory 14 in state 112. This can also be scheduled by the cache controller 25 at its leisure by placing the data into victim buffer 28 without feeding it through the dcache 30.

In any event, state 114 is next entered in which a main memory read is initiated in the event that the lookup resulted in a miss in the bcache.

Figure 3B:
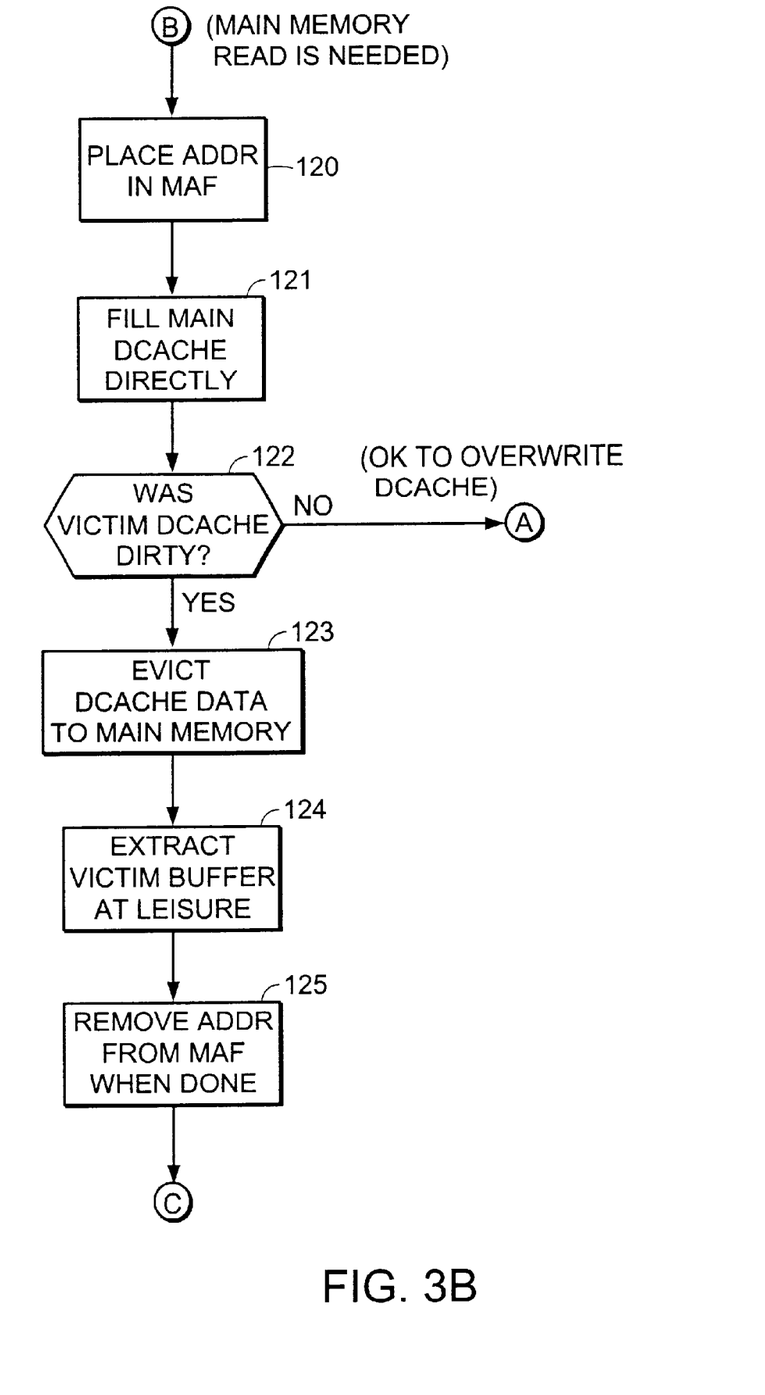

This process, continued in FIG. 3B, first places the referenced address in a miss address file 29 in state 120. In the next state 121, the fill from main memory 14 to the dcache 30 proceeds directly, bypassing the bcache 40 as previously described.

In the meantime, in state 122, if the victim dcache location was not dirty, then it is okay to overwrite the dcache 30 and no further processing is needed and the idle state "a" may be reentered.

If, however, the victim dcache location was dirty, then the victim dcache data is continued to be extracted from the victim buffer 28 to main memory 14 in state 123 and state 124. Only once the victim buffer 28 is emptied for the corresponding address is the corresponding address removed from the miss address file in state 125.

Note that the above process does not require any explicit invalidation of the bcache tag 43. In other words, no write back to the bcache tag array 44 was required. Rather, two explicit rules were used to determine the true status of the block read from the dcache 40. In particular, if any reference subset matches a block in the dcache, then the associated bcache block is ignored.

In addition, if any memory reference subset matches a block in the miss address file 29, then the associated bcache block is ignored. Any further load or store references which subset match the first reference are not allowed to proceed until the memory fill has been completed and the associated miss address file entry is retired. As a result, no agent in the host processor 12-1 can illegally use the stale bcache data.

Figure 4:
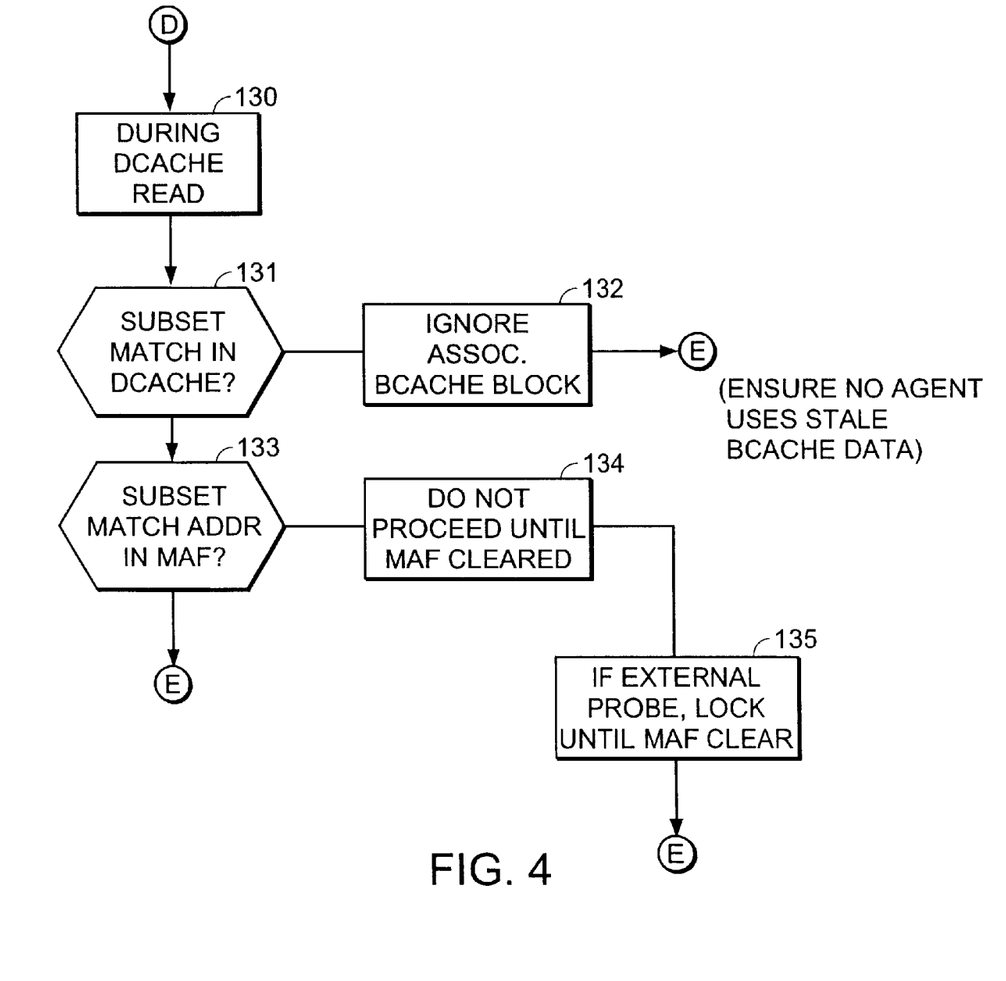
FIG. 4 is a state diagram of the operations performed during a dcache read operation in order to maintain cache hierarchy coherency.

References generated by probes from other processes 12-n follow a process flow similar to that shown in FIGS. 3A, 3B, and 4. The one exception is that they do not generate victim transactions since the probe commands themselves cannot result in displacement of locations from cache memories. However, they do cause the miss address file to be checked, such as in state 125. In the case of a subset match with a probe command, the bcache block is ignored and a miss response is delivered as a result to the probe command indicating that the block is locked. The block will thus remain indicated as locked until the entry is removed from the miss address file.

This is indicated in the process flow of FIG. 4 where state 133 is entered during a dcache read if there is a subset match in the miss address file. Processing is not allowed to proceed until the miss address file is cleared in state 134. State 135 is entered into in response to an external probe command, and a lock response is generated until the miss address file is cleared. This ensures that no agent is allowed to use stale bcache data after victimization of such cache blocks.

In summary, the processor thus has independent buses for each of two different levels of cache memories. This permits a fill operation for the primary cache to progress at a higher speed for a primary on-chip cache. The invention allows the tag state of the other secondary cache to be inferred from data available which is internal to the processor. The removal of a tag write cycle back to the secondary cache and any associated bus turnaround cycles allows the processor to use the saved tag cycles for performing other tag lookups, such as, for example, from probe commands received from external processors. This feature provides critical performance improvements for systems that do not employ external duplicate tag filtering to resolve memory references.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for maintaining cache coherency in a data processing system in which the data processing system comprises a main memory, a primary cache, and a secondary cache, the method comprising the steps of:

during a memory fill operation from the main memory to the primary cache, providing data directly to the primary cache without first writing data to the secondary cache;

maintaining cache hierarchy consistency between the primary cache, the secondary cache, and the main memory without explicit invalidation of cache contents being performed during the fill operation; and during a secondary cache read operation, if a primary cahe victim operation will be reqired, determining if an index portion of a primary cache victim block is dirty, and if the primary cache victim block is dirty, and an index portion of a memory referenced location do not match the index portion of the primary cache victim block, evicting the primary cahe victim block to the secondary cache.

2. A method as in claim 1 additionally comprising the step of:

if the index portion of the memory match, scheduling the primary cache victim block for eviction to the main memory.

3. A method as in claim 1 additionally comprising the step of:

during the secondary cache read operation, if a secondary cache tag portion is dirty and the corresponding tag portion for the location in the primary cache has not already been evicted to the main memory, inferring that the secondary cache contents are not stale, and thus writing the secondary cache victim block to the main memory.

4. A method for maintaining cache coherency in a data processing system in which the data processing system comprises a main memory, a primary cache, and a secondary cache, the method comprising the steps of:

during a memory fill operation from the main memory to the primary cache, providing data directly to the primary cache without first writing data to the secondary cache;

maintaining cahe hierarchy consistency between the primary cache, the secondary cache, and the main memory without explicit invalidation of cache contents being performed during the fill operation;

during a secondary cache read operation, if a secondary cache tag portion is dirty and the corresponding tag portion for the location in the primary cache has not already been evicted to main memory, inferring that the secondary cache contents are not stale, and thus writing the secondary cache victim block to the main memory;

if the secondary cache tag and the referenced memory location tag do not match, storing the referenced address in a miss address file; and allowing a fill operation from the main memory to proceed to the primary cache directly, without first storing fill data in the secondary cache.

5. A method as in claim 4 additionally comprising the step of:

if the primary cache victim block was dirty, then evicting the primary cache victim block to the main memory by placing it in a victim buffer; and clearing the referenced address from the miss address file once the victim buffer has been cleared.

6. A method as in claim 5 additionally comprising the step of:

upon a subsequent match between a memory reference instruction and an address in the miss address file, preventing the memory reference instruction from proceeding until the miss address file is cleared.

7. A method as in claim 6 additionally comprising the step of:

if the memory reference instruction is an external probe operation, returning a memory lock response to the source of the external probe operation until the miss address file is cleared.

* * * * *